United States Patent
Kim et al.

(10) Patent No.: US 6,690,712 B2
(45) Date of Patent: Feb. 10, 2004

(54) APPARATUS AND METHOD FOR TRANSMISSION DIVERSITY USING MORE THAN TWO ANTENNAS

(75) Inventors: Sung-Jin Kim, Suwon-shi (KR); Byung-Jae Kwak, Songnam-shi (KR); Yong-Suk Lee, Suwon-shi (KR); Seong-Ill Park, Kunpo-shi (KR); Ho-Kyu Choi, Seoul (KR); Min-Koo Kim, Suwon-shi (KR); Beong-Jo Kim, Songnam-shi (KR); Hyun-Woo Lee, Suwon-shi (KR); Jae-Yoel Kim, Kunpo-shi (KR); Sang-Hwan Park, Suwon-shi (KR)

(73) Assignee: Samsung Electronics Co., Ltd. (KR)

( * ) Notice: Subject to any disclaimer, the term of this patent is extended or adjusted under 35 U.S.C. 154(b) by 94 days.

(21) Appl. No.: 09/865,272

(22) Filed: May 25, 2001

(65) Prior Publication Data

US 2002/0118727 A1 Aug. 29, 2002

(30) Foreign Application Priority Data

May 25, 2000 (KR) .......................................... 2000-29136
Aug. 18, 2000 (KR) .......................................... 2000-47913
Aug. 24, 2000 (KR) .......................................... 2000-49259

(51) Int. Cl.[7] .............................................. H04B 1/69
(52) U.S. Cl. ...................................... 375/146; 375/147
(58) Field of Search ................................ 375/295, 146, 375/147, 148, 130; 370/342, 335, 441

(56) References Cited

U.S. PATENT DOCUMENTS

| | | | | |
|---|---|---|---|---|
| 5,361,276 A | * | 11/1994 | Subramanian | ............... 375/150 |
| 5,471,647 A | | 11/1995 | Gerlach et al. | |
| 5,634,199 A | | 5/1997 | Gerlach et al. | |
| 6,038,263 A | | 3/2000 | Kotzin et al. | |
| 6,173,007 B1 | * | 1/2001 | Odenwalder et al. | ....... 375/146 |
| 6,205,127 B1 | * | 3/2001 | Ramesh | ..................... 370/329 |

OTHER PUBLICATIONS

European Search Report dated May 26, 2003, issued in a counterpart application, namely, Appln. No. 01934586.7.

Rajan, D. et al., "Transmit Diversity Schemes for CDMA–2000," IEEE Wireless Communications and Networking Conference, vol. 2, Sep. 1999, pp. 669–673.

Jongren, G. et al., "Combining Transmit Antenna Weights and Orthogonal Space–Time Block Codes by Utilizing Side Information," Signals, Systems and Computers, 1999, Conference Record of the Thirty–Third Asilomar Conference, Oct. 24–27, 1999, pp. 1562–1566.

* cited by examiner

*Primary Examiner*—Tesfaldet Bocure
(74) *Attorney, Agent, or Firm*—Dilworth & Barrese, LLP (57) ABSTRACT

There is provided a transmission diversity system. In the case where an MS supporting a different antenna transmission diversity scheme enters the service area of a 4-antenna transmission diversity UTRAN, the UTRAN can transmit pilot signals and common data signals to the MS without the need of modifications to the MS. Therefore, power is distributed among antennas of the UTRAN and system capacity is increased.

20 Claims, 6 Drawing Sheets

APPARATUS AND METHOD FOR TRANSMISSION DIVERSITY USING MORE THAN TWO ANTENNAS

PRIORITY

This application claims priority to an application entitled "Apparatus and Method for Transmission Diversity Using More Than Two Antennas" filed in the Korean Industrial Property Office on May 25, 2000 and assigned Ser. No. 2000-29136, to an application entitled "Apparatus and Method for Transmission Diversity Using More Than Two Antennas" filed in the Korean Industrial Property Office on Aug. 24, 2000 and assigned Serial No. 2000-49259, and to an application entitled "Apparatus and Method for Transmission Diversity Using More Than Two Antennas" filed in the Korean Industrial Property Office on Aug. 28, 2000 and assigned Ser. No. 2000-47913, the contents of each of which are hereby incorporated by reference.

BACKGROUND OF THE INVENTION

1. Field of the Invention

The present invention relates generally to a transmission diversity system, and in particular, to a system where a UTRAN (UMTS Terrestrial Radio Access Network) operates compatibly with a mobile station (MS) supporting a different transmission diversity technique.

2. Description of the Related Art

A third generation mobile communication system has been developed for high-speed data transmission along with the rapid advance of mobile communication technology and the increase of the amount of data being transmitted. W-CDMA (Wideband Code Division Multiple Access), an asynchronous scheme between UTRANs, is standardized as the third generation mobile communication system for Europe, and CDMA-2000, a synchronous scheme between base stations, is standardized as the third generation mobile communication system for North America. In the mobile communication systems, a plurality of MSs communicate through one base station. When data is transmitted at a high rate, the phase of a received signal is distorted due to fading on a radio channel. The fading reduces the amplitude of the received signal by several decibels to tens of decibels. If the distortion is not compensated for in data demodulation, mobile communication quality is deteriorated. Thus, many diversity techniques have been used to overcome fading.

CDMA usually employs a rake receiver for receiving a signal with diversity utilizing the delay spread of a channel. While the reception diversity relying on the delay spread is applied to the rake receiver, the rake receiver does not operate if the delay spread is less than a threshold. Time diversity relying on interleaving and coding is used for a Doppler spread channel. The time diversity, however, is difficult to apply to a slow Doppler spread channel.

Therefore, space diversity applies to a channel with a small spread delay and a slow Doppler spread channel to overcome fading. For the space diversity, at least two transmission/reception antennas are used. Although the strength of a signal transmitted through one antenna is reduced due to fading, a signal transmitted through the other antenna is received. The space diversity is divided into reception diversity using reception antennas and transmission diversity using transmission antennas. Because it is difficult to install a plurality of antennas in an MS for the reception diversity in terms of cost and terminal size, it is recommended to implement the transmission diversity technique in a UTRAN with a plurality of antennas.

The transmission diversity technique is implemented in an algorithm for receiving a downlink signal and obtaining a diversity gain. The algorithm is generally divided into an open loop mode and a closed loop mode. In the open loop mode, if a UTRAN encodes a data signal and transmits the coded signal through diversity antennas, an MS receives the signal from the UTRAN and obtains a diversity gain by decoding it. In the closed loop mode, if the MS estimates channel environments that signals transmitted through transmission antennas of the base station will experience, calculates weights that maximize the power of reception signals for the transmission antennas based on the estimated values, and transmits the weights as signals to the UTRAN on an uplink channel, the UTRAN adjusts the weights of the antennas based on the weight signals received from the MS. To help the MS estimate the channels, the UTRAN transmits pilot signals through the respective transmission antennas to the MS. Then, the MS estimates the channels according to the pilot signals and acquires optimum weights based on the channel information.

Transmission diversity is applied in a feed-back mode in U.S. Pat. No. 5,634,199 entitled "Method of Subspace Beamforming Using Adaptive Transmitting Antennas with Feed-Back" and U.S. Pat. No. 5,471,647 entitled "Method for Minimizing Cross-talk in Adaptive Transmission Antennas". While the former proposes channel estimation and feed-back in a perturbation algorithm and a gain matrix, this is a blind scheme that is not suitable for a system with pilots due to a slow convergence speed for channel estimation and difficulty in obtaining accurate weights.

The 3GPP ($3^{rd}$ Generation Partnership Project) specification (Release 99) for UMTS (Universal Mobile Telecommunications System) has suggested quantization and feedback of weights for two antennas. It describes only the case in which an MS supports 2-antenna transmission diversity. The specification made no comment on signal transmission from a UTRAN with transmission antennas and signal transmission and reception in the case where a 2-antenna transmission diversity MS coexists with a 4-antenna transmission diversity MS. Expansion to four antennas by adaptively using a conventional method of expanding signal transmission through one antenna to signal transmission through two antennas is not valid for the 2-antenna transmission diversity MS. Simultaneous use of a signal transmission method using two antennas and a signal transmission method using four antennas also has the problem of power imbalance between the antennas.

Different pilot signals can be transmitted through a plurality of antennas by time division multiplexing, frequency division multiplexing, and code division multiplexing. In W-CDMA, code division multiplexing can be performed with the use of multiple scrambling codes, channelization codes, or multiple orthogonal pilot symbol patterns in order to transmit different pilot signals through the antennas.

In general, a high diversity gain and an SNR (Signal to Noise Ratio) gain of up to 3 dB are acquired by using two transmission antennas, as compared to a conventional system using a single transmission antenna. If transmission diversity is implemented with more than two antennas, an additional diversity gain is obtained besides the diversity gain in a two antenna-transmitter and an SNR gain increases in proportion to the number of antennas. The additional diversity gain is less than that obtained from the 2-antenna transmission diversity but since the diversity order increases, the diversity gain is very high if the SNR (Eb/No) increases.

The 3GPP specification (Release 99) describes a UMTS system operated with 2-antenna transmission diversity but considers the need of transmission diversity using more than two antennas. Consideration should also be given to a transmission/reception framework for a mobile telecommunication system where an existing MS receiving signals from two transmission antennas coexists with an MS receiving signals from more than two antennas. That is, even if an MS designed to communicate with a UTRAN with 2-antenna transmission diversity is located within the coverage area of a UTRAN supporting more than 2-antenna transmission diversity, the MS should operate normally, and vice versa for an MS designed to communicate the UTRAN with more than 2-antenna transmission diversity. It is also necessary to ensure compatible operation of the more than 2-antenna transmission diversity UTRAN with the 2-antenna transmission diversity MS.

The need for compatibility is more pressing for a common pilot channel (CPICH) and a common data channel (CDCH). While a dedicated channel transmits a signal adaptively to a given number of antennas according to the characteristics and version of an MS, the common pilot channel and the common data channel must operate in both a lower-version MS operated in the conventional 2-antenna transmission diversity scheme and a higher-version MS operated in a more than 2-antenna transmission diversity scheme. That is, a common channel is transmitted with stronger power than a dedicated channel because the system should give higher signal reliability to the common channel. Therefore, if an antenna transmission diversity gain is obtained from the common channel, communications can be conducted with low transmission power, thereby increasing system capacity. In other words, the number of subscribers allowable for the system can be increased.

A transmission antenna system refers to a system that transmits signals through a plurality of antennas. A transmission RF system including a low noise amplifier (LNA), for example, is effective in terms of cost and efficiency as long as it uniformly distributes the power of signals transmitted through the antennas. Otherwise, antennas are relatively difficult to design and their cost is high. When transmission power balance is set between transmission signals of the antennas through power distribution, only efficient designing of a transmission/reception system ensures compatibility between the different transmission diversity schemes.

SUMMARY OF THE INVENTION

An object of the present invention is, therefore, to provide a signal transmission method and apparatus for transmission diversity using four antennas in a UTRAN.

Another object of the present invention is to provide a reception method and apparatus for receiving signals from a 4-antenna transmission diversity UTRAN in an MS.

A further object of the present invention is to provide a signal transmission method and apparatus in a system operated in transmission diversity schemes using different numbers of antennas.

Still another object of the present invention is to provide a pilot signal transmission method and apparatus in a system operated in transmission diversity schemes using different numbers of antennas.

Yet another object of the present invention is to provide a pilot signal reception method and apparatus in a system operated in transmission diversity schemes using different numbers of antennas.

Still further object of the present invention is to provide a pilot signal reception method and apparatus for effectively utilizing limited orthogonal code resources in a system operated in transmission diversity schemes using different numbers of antennas.

The foregoing and other objects are achieved by providing an antenna transmission diversity method and apparatus. According to one aspect of the present invention, in a transmitter of a UTRAN having at least four antennas, a first adder is connected to a first antenna, and adds a first spread signal produced by spreading a first symbol pattern with a first orthogonal code and a second spread signal produced by spreading the first symbol pattern with a second orthogonal code orthogonal to the first orthogonal code. A second adder is connected to a second antenna, and adds the first spread signal and a third spread signal produced by spreading a first inverted symbol pattern resulting from inverting the phase of the first symbol pattern with the second orthogonal code. A third adder is connected to a third antenna, and adds a fourth spread signal produced by spreading a second symbol pattern orthogonal to the first symbol pattern with the first orthogonal code and a fifth spread signal produced by spreading the second symbol pattern with the second orthogonal code. A fourth adder is connected to a fourth antenna, and adds the fourth spread signal and a sixth spread signal produced by spreading a second inverted symbol pattern resulting from inverting the phase of the second symbol pattern with the second orthogonal code.

According to another aspect of the present invention, in a UTRAN transmitter, a first adder is connected to a first antenna, and adds a first spread signal produced by multiplying a first symbol pattern by a gain constant and spreading the product with a first orthogonal code and a second spread signal produced by spreading the first symbol pattern with a second orthogonal code orthogonal to the first orthogonal code. A second adder is connected to a second antenna, and adds the first spread signal and a third spread signal produced by spreading a first inverted symbol pattern resulting from inverting the phase of the first symbol pattern with the second orthogonal code. A third adder is connected to a third antenna, and adds a fourth spread signal produced by multiplying a second symbol pattern by the gain constant and spreading the product with the first orthogonal code and a fifth spread signal produced by spreading the second symbol pattern with the second orthogonal code. A fourth adder is connected to a fourth antenna, and adds the fourth spread signal and a sixth spread signal produced by spreading a second inverted symbol pattern resulting from inverting the phase of the second symbol pattern with the second orthogonal code.

According to a third aspect of the present invention, in a signal transmitting method in a UTRAN, a first spread signal produced by spreading a first symbol pattern with a first orthogonal code is added to a second spread signal produced by spreading the first symbol pattern with a second orthogonal code orthogonal to the first orthogonal code and the sum is transmitted through a first antenna. The first spread signal is added to a third spread signal produced by spreading a first inverted symbol pattern resulting from inverting the phase of the first symbol pattern with the second orthogonal code, and the sum is transmitted through a second antenna. The fourth spread signal produced by spreading a second symbol pattern orthogonal to the first symbol pattern with the first orthogonal code is added to a fifth spread signal produced by spreading the second symbol pattern with the second orthogonal code, and the sum is transmitted through a third antenna. The fourth spread signal is added to a sixth spread signal produced by spreading a second inverted symbol pattern resulting from inverting the phase of the second symbol pattern with the second orthogonal code, and the sum is transmitted through a fourth antenna.

According to a fourth aspect of the present invention, in a signal transmitting method in a UTRAN, a first spread signal produced by multiplying a first symbol pattern by a gain constant and spreading the product with a first orthogonal code is added to a second spread signal produced by spreading the first symbol pattern with a second orthogonal code orthogonal to the first orthogonal code, and the sum is transmitted through a first antenna. The first spread signal is added to a third spread signal produced by spreading a first inverted symbol pattern resulting from inverting the phase of the first symbol pattern with the second orthogonal code, and the sum is transmitted through a second antenna. A fourth spread signal produced by multiplying a second symbol pattern by the gain constant and spreading the product with the first orthogonal code is added to a fifth spread signal produced by spreading the second symbol pattern with the second orthogonal code, and the sum is transmitted through a third antenna. The fourth spread signal is added to a sixth spread signal produced by spreading a second inverted symbol pattern resulting from inverting the phase of the second symbol pattern with the second orthogonal code, and the sum is transmitted through a fourth antenna.

According to a fifth aspect of the present invention, in a transmitter of a UTRAN, a first adder is connected to a first antenna, and adds a first spread signal produced by spreading a first symbol pattern with a first orthogonal code and a second spread signal produced by spreading the first symbol pattern with a second orthogonal code orthogonal to the first orthogonal code. Here, the first orthogonal code has chips of all 0s and the second orthogonal code has 0s in the first half chips and 1s in the latter half chips. A second adder is connected to a second antenna, and adds the first spread signal and a third spread signal produced by spreading a first inverted symbol pattern resulting from inverting the phase of the first symbol pattern with the second orthogonal code. A third adder is connected to a third antenna, and adds a fourth spread signal produced by spreading a second symbol pattern orthogonal to the first symbol pattern with the first orthogonal code and a fifth spread signal produced by spreading the second symbol pattern with the second orthogonal code. A fourth adder is connected to a fourth antenna, and adds the fourth spread signal and a sixth spread signal produced by spreading a second inverted symbol pattern resulting from inverting the phase of the second symbol pattern with the second orthogonal code.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described hereinbelow with reference to the accompanying drawings. In the following description, well-known functions or constructions are not described in detail since they would obscure the invention in unnecessary detail.

Figure 1:
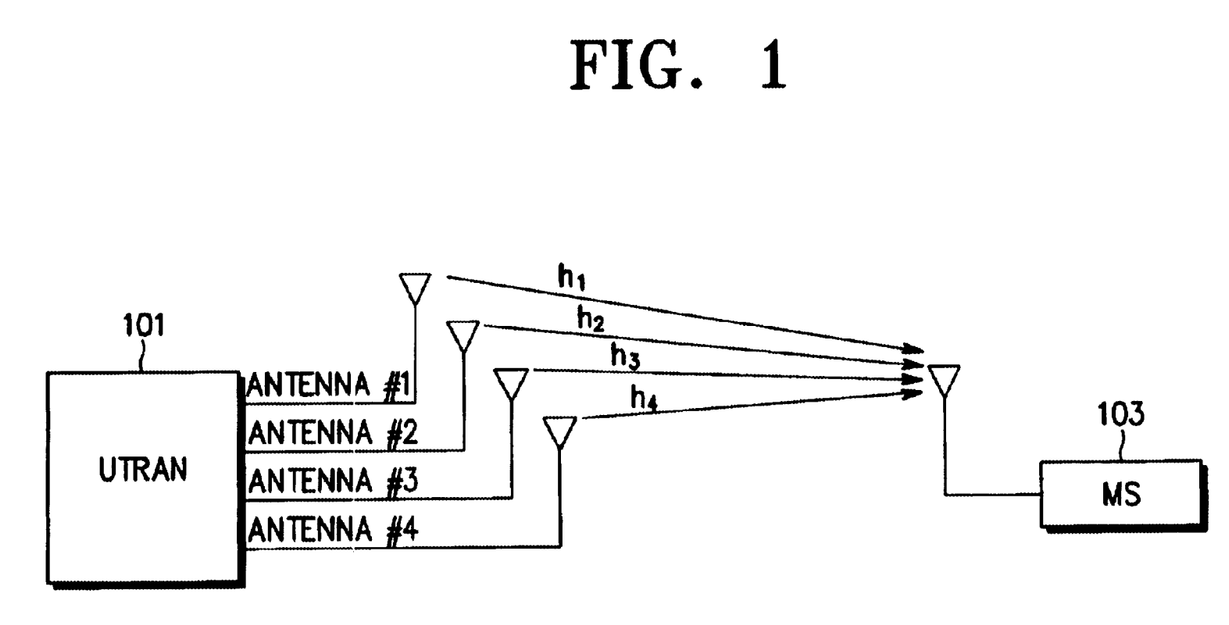
FIG. 1 schematically illustrates a typical 4-antenna transmission diversity system configuration.

FIG. 1 illustrates a typical 4-antenna transmission diversity system configuration.

Referring to FIG. 1, a UTRAN 101 has four antennas, converts a user signal suitably for transmission through antennas #1 to #4, and transmits converted signals through antennas #1 to #4. An MS 103 receives the signals transmitted through antennas #1 to #4 on channels $h_1$ to $h_4$, respectively. The MS 103 recovers the original transmission data from the received signals by demodulation and decoding.

Figure 2:
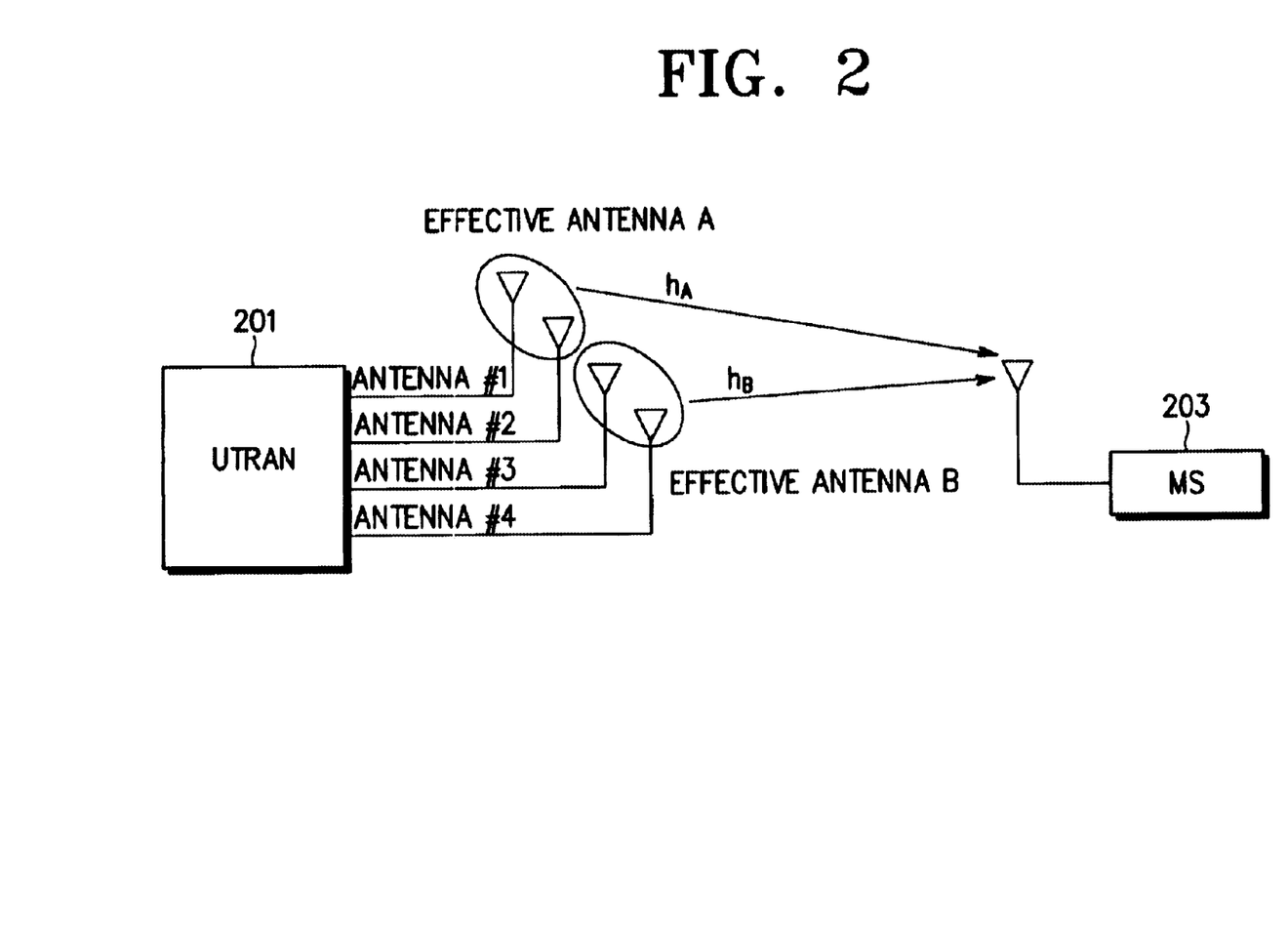
FIG. 2 schematically illustrates a 4-antenna transmission diversity system configuration according to an embodiment of the present invention.

FIG. 2 schematically illustrates a 4-antenna transmission diversity system configuration according to an embodiment of the present invention. MS 203 supporting a 2-antenna transmission diversity technique receives four pilot signals from a UTRAN 201 as if it did from two antennas in the 4-antenna transmission diversity system. That is, the MS 203 receives signals from antennas #1 and #2 on a channel $h_A$ and signals from antennas #3 and #4 on a channel $h_B$.

For the case where a 2-antenna transmission diversity MS enters the coverage area of the 4-antenna transmission diversity UTRAN 201, the structure of a transmitter in the UTRAN 201 will be described referring to FIG. 3.

Figure 3:
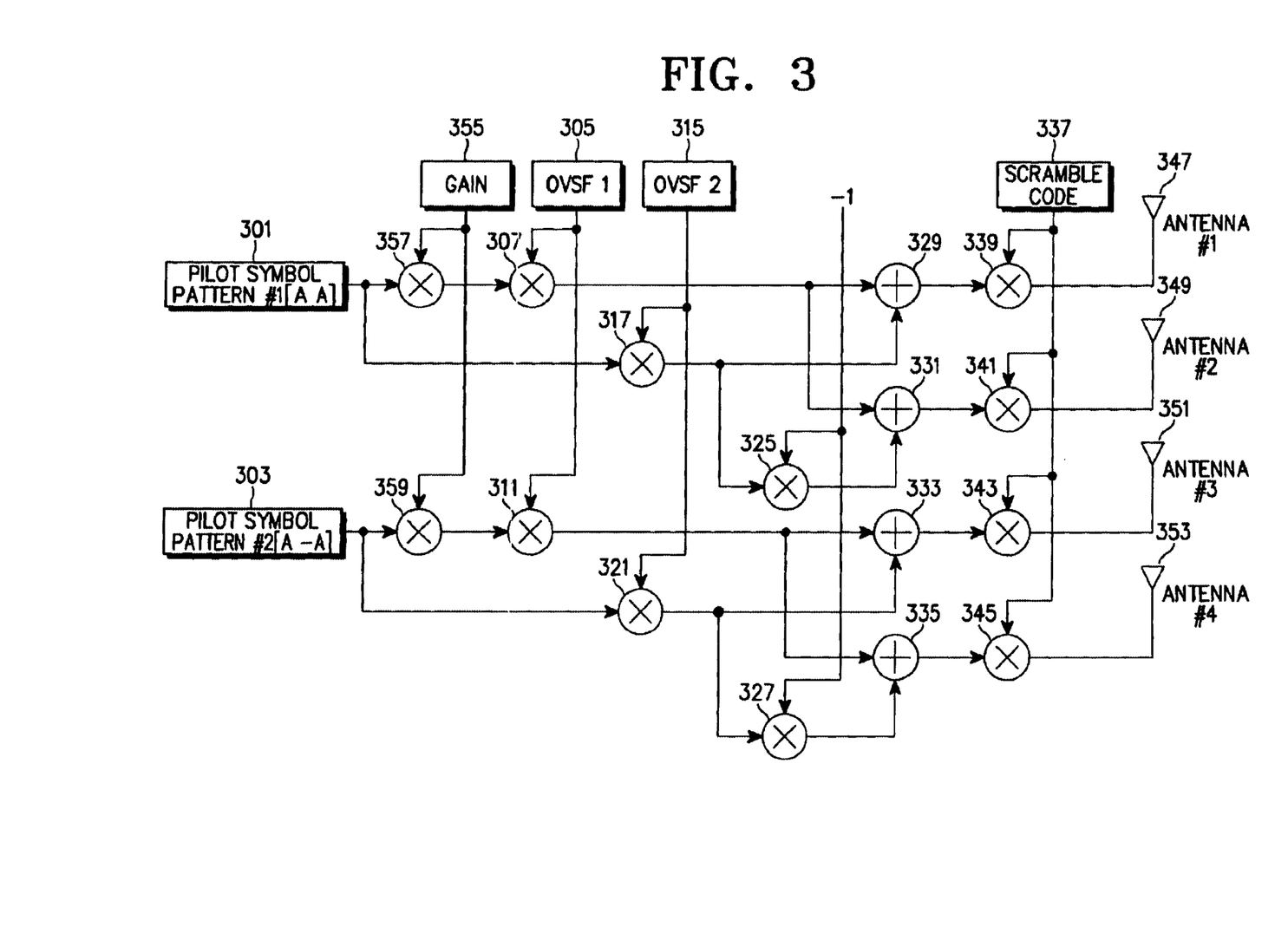
FIG. 3 is a block diagram of a transmission diversity transmitter for transmitting pilot signals according to the embodiment of the present invention.

FIG. 3 is a block diagram of a transmission diversity transmitter, showing a pilot signal transmission method according to the embodiment of the present invention. Pilot outputs from antennas #1 to #4 (347 to 353) are expressed in the following equations, respectively.

$$x_1(t)=p_1(t)\times(g\cdot C_{OVSF1}(t)+c_{OVSF2}(t))\times c_{sc}(t) \quad (1)$$

$$x_2(t)=p_1(t)\times(g\cdot C_{OVSF1}(t)-c_{OVSF2}(t))\times c_{sc}(t) \quad (2)$$

$$x_3(t)=p_2(t)\times(g\cdot C_{OVSF1}(t)+c_{OVSF2}(t))\times c_{sc}(t) \quad (3)$$

$$x_4(t)=p_2(t)\times(g\cdot C_{OVSF1}(t)-c_{OVSF2}(t))\times c_{sc}(t) \quad (4)$$

where $p_1(t)$ is a pilot symbol pattern 301, symbol pattern #1 [A, A] and $p_2(t)$ is a pilot symbol pattern 303, symbol pattern #2 [A, −A] or [−A, A] orthogonal to the pilot symbol pattern [A, A]. Walsh codes or orthogonal variable spreading factor (OVSF) codes $c_{OVSF1}(t)$ and $c_{OVSF2}(t)$ with which the pilot symbol patterns 301 and 303 are spread are OVSF1 305 and OVSF2 315.

As shown in FIG. 3, the UTRAN transmitter transmits the pilot symbol patterns with the two different, orthogonal codes OVSF1 305 and OVSF 315 so that a receiver in an MS can discriminate between the pilot signals received from the transmission antennas. Since an additional orthogonal code should be used to identify each transmission antenna, orthogonal code resources are further consumed. For efficient use of limited orthogonal code resources, it is preferable that the first orthogonal code OVSF1 305 is all 0s in its chips and the second orthogonal code OVSF2 315 is 0s in the first half chips and 1s in the latter half chips. For example, OVSF1 305 can be "0000 . . . 0000" and OVSF2 315 "0000 . . . 000111 . . . 1111".

The code $c_{sc}$ (t) is a scrambling code 337 with the same chip rate as that of the orthogonal codes. The constant g is a gain constant 355 used to ensure the performance of the MS supporting the conventional 2-antenna transmission diversity technique.

A pilot signal A to be transmitted through an antenna by the UTRAN 201 may be 1 or –1 in BPSK modulation and 1+j in QPSK modulation. Therefore, the first pilot symbol pattern 301 is multiplied by the gain constant g 355 in a multiplier 357 and by the orthogonal code OVSF1 305 in a multiplier 307, and applied to the input of an adder 329. The orthogonal code OVSF1 has a length of 256 chips by way of example. The first pilot symbol pattern 301 is also multiplied by the orthogonal code OVSF2 in a multiplier 317 and applied to the input of the adder 329. The adder 329 adds the outputs of the multipliers 307 and 317. The sum is multiplied by the scrambling code 337 in a multiplier 339 and transmitted through the first antenna 347.

Meanwhile, a multiplier 325 multiplies the product of the first pilot symbol pattern 301 and the second orthogonal code OVSF2 315 by –1. Then, an adder 331 adds the output of the multiplier 307 and the output of the multiplier 325 and the sum is transmitted through the second antenna 349. While the multiplier 325 inverts the phase of the input signal by multiplying it by –1, the phase inversion can be performed at any input terminal or output terminal in the UTRAN transmitter.

The second pilot symbol pattern 303 is multiplied by the gain 355 in a multiplier 359 and by the orthogonal code OVSF1 305 in a multiplier 311. The second pilot symbol pattern 303 is also multiplied by the orthogonal code OVSF2 315 in a multiplier 321. An adder 333 adds the outputs of the multipliers 311 and 321. The sum is multiplied by the scrambling code 337 by a multiplier 343 and transmitted through the third antenna 351.

Meanwhile, a multiplier 327 multiplies the product of the second pilot symbol pattern 303 and the orthogonal code OVSF2 305 by –1. While the multiplier 327 inverts the phase of the input signal by multiplying it by –1, the phase inversion can be performed at any input terminal or output terminal in the UTRAN transmitter, as stated above. Then, an adder 335 adds the outputs of the multipliers 311 and 327. The sum is multiplied by the scrambling code 337 in a multiplier 345 and transmitted through the fourth antenna 353.

In the above transmitter structure, the adders 329, 331, 333, and 335 may be incorporated into one adder for adding input signals. Also, the multipliers 339, 341, 343, and 345 may be incorporated into one multiplier for complex spreading because they are the same in multiplying the scrambling code 337 by their respective input signals. The multipliers 325 and 327 invert signals directed to the second and fourth antennas 349 and 353 and their positions can be changed as far as they perform the function intact. For example, the multiplier 325 can invert an input pilot symbol pattern or the orthogonal code OVSF2 315 before the multiplier 317. The same effect is obtained when the multiplier 325 is removed, and instead the adder 331 subtracts the output of the multiplier 317 from the output of the multiplier 307. In the same manner, it is possible that the multiplier 327 inverts an input pilot symbol pattern or the orthogonal code OVSF2 315 before the multiplier 321, or that the adder 335 subtracts the output of the multiplier 321 from the output of the multiplier 311 with the multiplier 327 removed. If the constant g 355 is 1, the gain block is removed from the above hardware structure. The gain constant g 355 is a predetermined constant or a variable that is adaptively controlled on a predetermined basis (symbol, slot, or frame) according to a channel environment or user circumstances.

Figure 4:
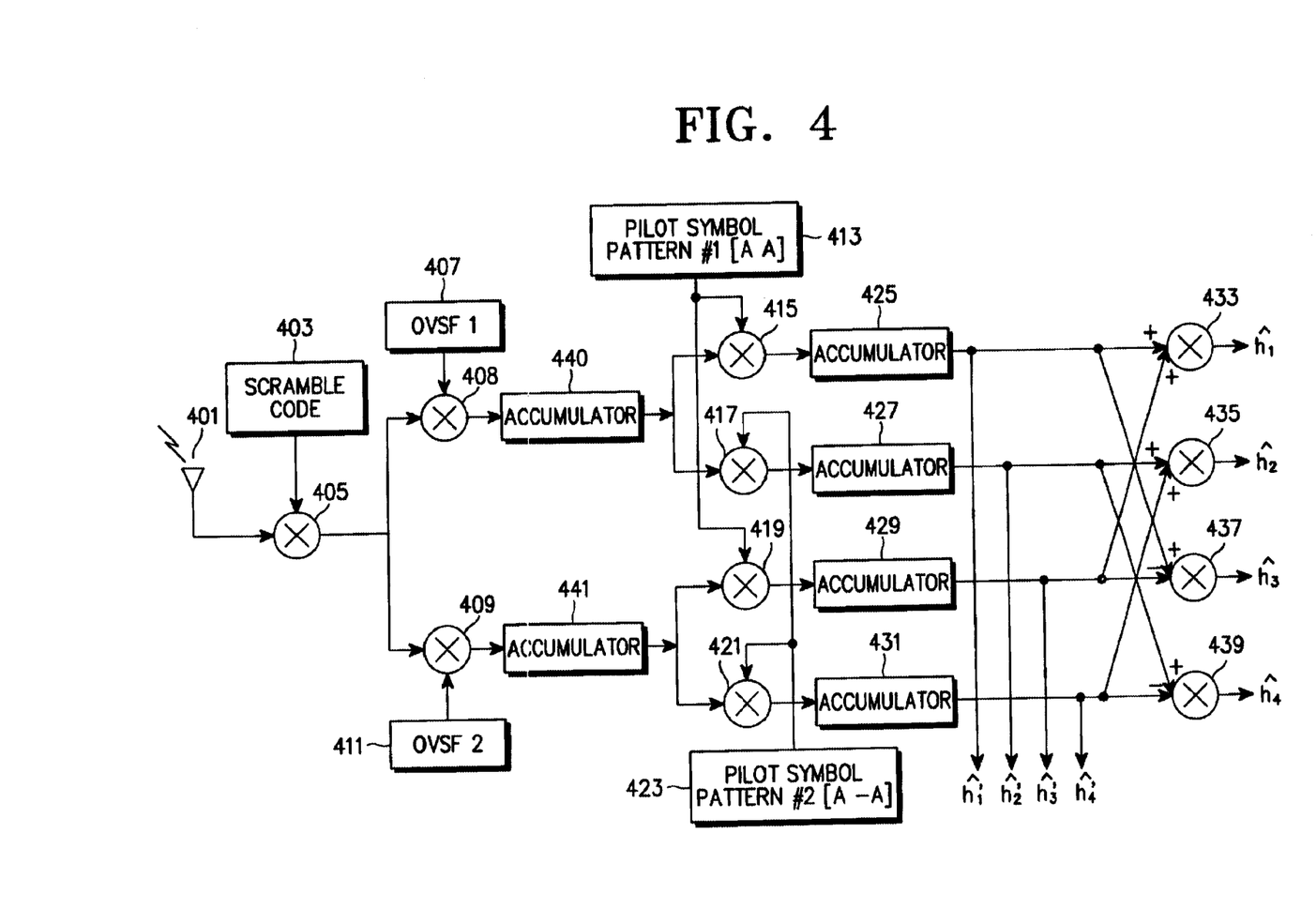
FIG. 4 is a block diagram of a transmission diversity receiver for pilot signal estimation according to the embodiment of the present invention.

FIG. 4 is a block diagram of a transmission diversity receiver for estimating pilot signals as the counterpart of the transmission diversity transmitter shown in FIG. 3 according to the embodiment of the present invention.

In FIG. 4, four outputs of the receiver, that is, channel estimated values for the first to fourth antennas 347 to 353 are expressed in the following equations.

$$\hat{h}_1 = \int r(t) \cdot c_{SC}(t) \cdot C_{OVSF1}(t)\{p_1(t) + p_2(t)\} dt \quad (5)$$

$$\hat{h}_2 = \int r(t) \cdot c_{SC}(t) \cdot C_{OVSF1}(t)\{p_1(t) - p_2(t)\} dt \quad (6)$$

$$\hat{h}_3 = \int r(t) \cdot c_{SC}(t) \cdot C_{OVSF2}(t)\{p_1(t) + p_2(t)\} dt \quad (7)$$

$$\hat{h}_4 = \int r(t) \cdot c_{SC}(t) \cdot C_{OVSF2}(t)\{p_1(t) - p_2(t)\} dt \quad (8)$$

where r(t) is a signal received at the MS 203 through an antenna 401, $p_1(t)$ is a pilot symbol pattern 413, $p_2(t)$ is a pilot symbol pattern 423 orthogonal to the pilot symbol pattern 413, the code $c_{OVSF1}(t)$ is a first orthogonal code OVSF1 407, the code $c_{OVSF2}(t)$ is a second orthogonal code OVSF2 411, and a code $c_{SC}(t)$ is a scrambling code 403. The pilot symbol patterns and the scrambling code are the same as used in the UTRAN and known beforehand to the MS.

The received signal r(t) is converted to a baseband signal and applied to a despreader 405. The despreader 405 despreads the baseband signal with the scrambling code 403 and feeds the despread signal to orthogonal despreaders 408 and 409. The orthogonal despreader 408 despreads the input signal with the first orthogonal code OVSF1 407 and the orthogonal despreader 409 despreads the input signal with the second orthogonal code OVSF2 411. An accumulator 440 accumulates the output of the orthogonal despreader 408 on a symbol basis, a multiplier 415 multiplies the accumulated signal by the first pilot symbol pattern 413, and an accumulator 425 accumulates the output of the multiplier 415 and amplifies the accumulated signal with the reciprocal of a first gain.

Meanwhile, a multiplier 417 multiplies the output of the accumulator 440 by the second pilot symbol pattern 423, and an accumulator 427 accumulates the output of the multiplier 417 and amplifies the accumulated signal with the reciprocal of a second gain.

An accumulator 441 accumulates the output of the orthogonal despreader 409 on a symbol basis, a multiplier 419 multiplies the accumulated signal by the first pilot symbol pattern 413, and an accumulator 429 accumulates the output of the multiplier 419. A multiplier 421 multiplies the output of the accumulator 441 by the second pilot symbol pattern 423, and an accumulator 431 accumulates the output of the multiplier 421.

An adder 433 adds the signals received from the accumulators 425 and 429 and outputs the sum as the pilot symbol pattern signal transmitted from the first antenna 347. An adder 435 adds the signals received from the accumulators 427 and 431 and outputs the sum as the pilot symbol pattern signal transmitted from the second antenna 349. An adder 437 subtracts the signal received from the accumulator 429 from the signal received from the accumulator 425 and outputs the difference as the pilot symbol pattern signal transmitted from the third antenna 351. An adder 439 subtracts the signal received from the accumulator 431 from the signal received from the accumulator 427 and outputs the difference as the pilot symbol pattern signal transmitted from the fourth antenna 353.

The structure of the transmission diversity system for transmitting/receiving pilot symbol patterns according to the embodiment of the present invention has been described above referring to FIGS. 3 and 4. Now there will be given a description of the structure of the transmission diversity system for transmitting/receiving common data symbol patterns according to the embodiment of the present invention with reference to FIGS. 5 and 6.

Figure 5:
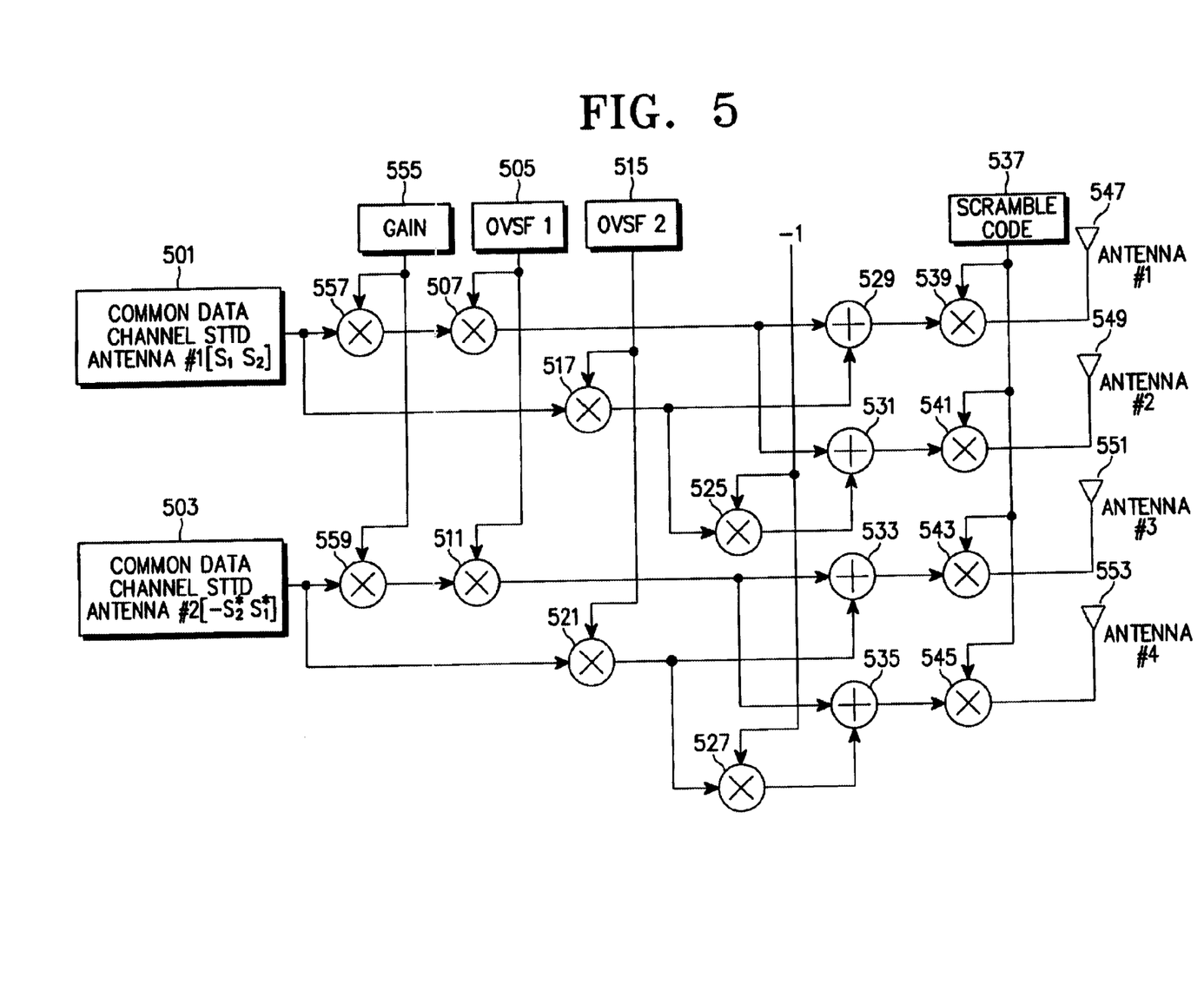
FIG. 5 is a block diagram of the transmission diversity transmitter for transmitting common data according to the embodiment of the present invention.

FIG. 5 is a block diagram of the transmission diversity transmitter, showing its common data transmission structure according to the embodiment of the present invention. Data outputs of four antennas #1 to #4 (547 to 553) are expressed in the following equations, respectively.

$$[y_1(2t)y_1(2t+1)]=[s(2t)\cdot c_{SC}(2t)s(2t+1)\cdot c_{SC}(2t+1)]\cdot(g\cdot c_{OVSF1}(2t)+c_{OVSF2}(2t)) \quad (9)$$

$$[y_2(2t)y_2(2t+1)]=[s(2t)\cdot c_{SC}(2t)s(2t+1)\cdot c_{SC}(2t+1)]\cdot(g\cdot c_{OVSF1}(2t)-c_{OVSF2}(2t)) \quad (10)$$

$$[y_3(2t)y_3(2t+1)]=[-s^*(2t+1)\cdot c_{SC}(2t)s^*(2t)\cdot c_{SC}(2t+1)]\cdot(g\cdot c_{OVSF1}(2t)+c_{OVSF2}(2t)) \quad (11)$$

$$[y_4(2t)y_4(2t+1)]=[-s^*(2t+1)\cdot c_{SC}(2t)s^*(2t)\cdot c_{SC}(2t+1)]\cdot(g\cdot c_{OVSF1}(2t)-c_{OVSF2}(2t)) \quad (12)$$

where [s(2t)s(2t+1)] is a reference antenna STTD code block 501, [−s*(2t+1)s*(2t)] is a diversity antenna STTD code block 503 complex-orthogonal to the two-data symbol pattern 501, and Walsh codes or OVSF codes $c_{OVSF1}(t)$ and $c_{OVSF2}(t)$ are OVSF1 505 and OVSF2 515, respectively. The code $c_{SC}(t)$ is a scrambling code 537, and g is a gain constant 555 used to ensure the performance of the MS supporting the 2-antenna transmission diversity.

A data signal A to be transmitted in the 4-antenna transmission diversity system may be 1 or −1 in BPSK modulation and {1+j, −1+j, 1−j, −1 −j} in QPSK modulation. The data signal A can be subject to a high efficiency modulation such as 8PSK, 16QAM, and 64QAM. It is assumed here that one of open loop mode schemes, STTD (Space Time block coding based Transmit Diversity) applies to the data signal A. STTD applies to a DPCH (Dedicated Physical Channel), a P_CCPCH (Primary Common Control Physical Channel), an S_CCPCH (Secondary Common Control Physical Channel), an SCH (Synchronous Channel), a PICH (Page Indication Channel), an AICH (Acquisition Indication Channel), and a PDSCH (Physical Downlink Shared Channel). In the present invention, respective antenna channels are estimated by performing STTD decoding on a common pilot channel. If the data signal A is input in the order of a symbol $S_1$ for a transmission diversity coding period $T_1$ and a symbol $S_2$ for a transmission diversity coding period $T_2$, the successive symbols $S_1S_2$ are transmitted through antenna #1 (547) in the form of $S_1S_2$ and through antenna #2 (549) in the form of $-S_2^*S_1^*$ after STTD coding. To describe the symbol STTD coding on a channel bit basis, it is assumed that the symbols $S_1$ and $S_2$ are channel bits $b_0b_1$ and $b_2b_3$ respectively. After STTD coding, antenna #1 (547) outputs channel bits $b_0b_1b_2b_3$ ($S_1S_2$) and antenna #2 outputs channel bits $-b_2b_3b_0-b_1$ ($-S_{2*S1}^*$) for the input $S_1S_2$, that is, $b_0b_1b_2b_3$. Here, antenna #1 (547) is a reference antenna and antenna #2 (549) is a diversity antenna.

The symbol patterns $S_1S_2$ and $-S_2^*S_1^*$ are respectively called a reference antenna STTD code block 501 and a diversity antenna STTD code block 503. A multiplier 557 multiplies the reference antenna STTD code block 501 by the gain constant g 555 and a multiplier 507 multiplies the output of the multiplier 557 by the first orthogonal code OVSF1 505. The first orthogonal code OVSF1 505 has a length of 256 chips by way of example. A multiplier 517 multiplies the reference antenna STTD code block 501 by the second orthogonal code OVSF2 515. An adder 529 adds the outputs of the multipliers 507 and 517 and a multiplier 539 multiplies the sum by the scrambling code 537. The output of the multiplier 539 is transmitted through antenna #1 (547).

Meanwhile, a multiplier 525 multiplies the product of the reference antenna STTD code block 501 and the second orthogonal code OVSF2 515 by −1. An adder 531 adds the outputs of the multipliers 507 and 525. A multiplier 541 multiplies the sum by the scrambling code 537. The output of the multiplier 541 is transmitted through antenna #2 (549).

A multiplier 559 multiplies the diversity antenna STTD code block 503 by the gain constant g 555 and a multiplier 511 multiplies the output of the multiplier 559 by the first orthogonal code OVSF1 505. A multiplier 521 multiplies the diversity antenna STTD code block 503 by the second orthogonal code OVSF2 515. An adder 533 adds the outputs of the multipliers 511 and 521 and a multiplier 543 multiplies the sum by the scrambling code 537. The output of the multiplier 543 is transmitted through antenna #3 (551).

Meanwhile, a multiplier 527 multiplies the product of the diversity antenna STTD code block 503 and the second orthogonal code OVSF2 515 by −1. An adder 535 adds the outputs of the multipliers 511 and 527. A multiplier 545 multiplies the sum by the scrambling code 537. The output of the multiplier 545 is transmitted through antenna #4 (553).

In the above transmitter structure, the adders 529, 531, 533, and 535 may be incorporated into one adder for adding input signals. Also, the multipliers 539, 541, 543, and 545 may be incorporated into one multiplier for complex spreading because they are the same in multiplying the scrambling code 537 by their respective input signals. The multipliers 525 and 527 invert signals directed to antennas #2 and #4 (549 and 553) and their positions can be changed as far as they perform the function intact. For example, the multiplier 525 can invert an input data symbol pattern or the orthogonal code OVSF2 515 before the multiplier 517. The same effect is obtained when the multiplier 525 is removed, and instead the adder 531 subtracts the output of the multiplier 517 from the output of the multiplier 507. In the same manner, it is possible that the multiplier 527 inverts an input data symbol pattern or the orthogonal code OVSF2 515 before the multiplier 521, or that the adder 535 subtracts the output of the multiplier 521 from the output of the multiplier 511 with the multiplier 527 removed. If the constant g 555 is 1, the gain block is removed from the above hardware structure. The gain constant g 555 is a predetermined constant or a variable that is adaptively controlled on a symbol basis according to a channel environment or user circumstances.

Figure 6:
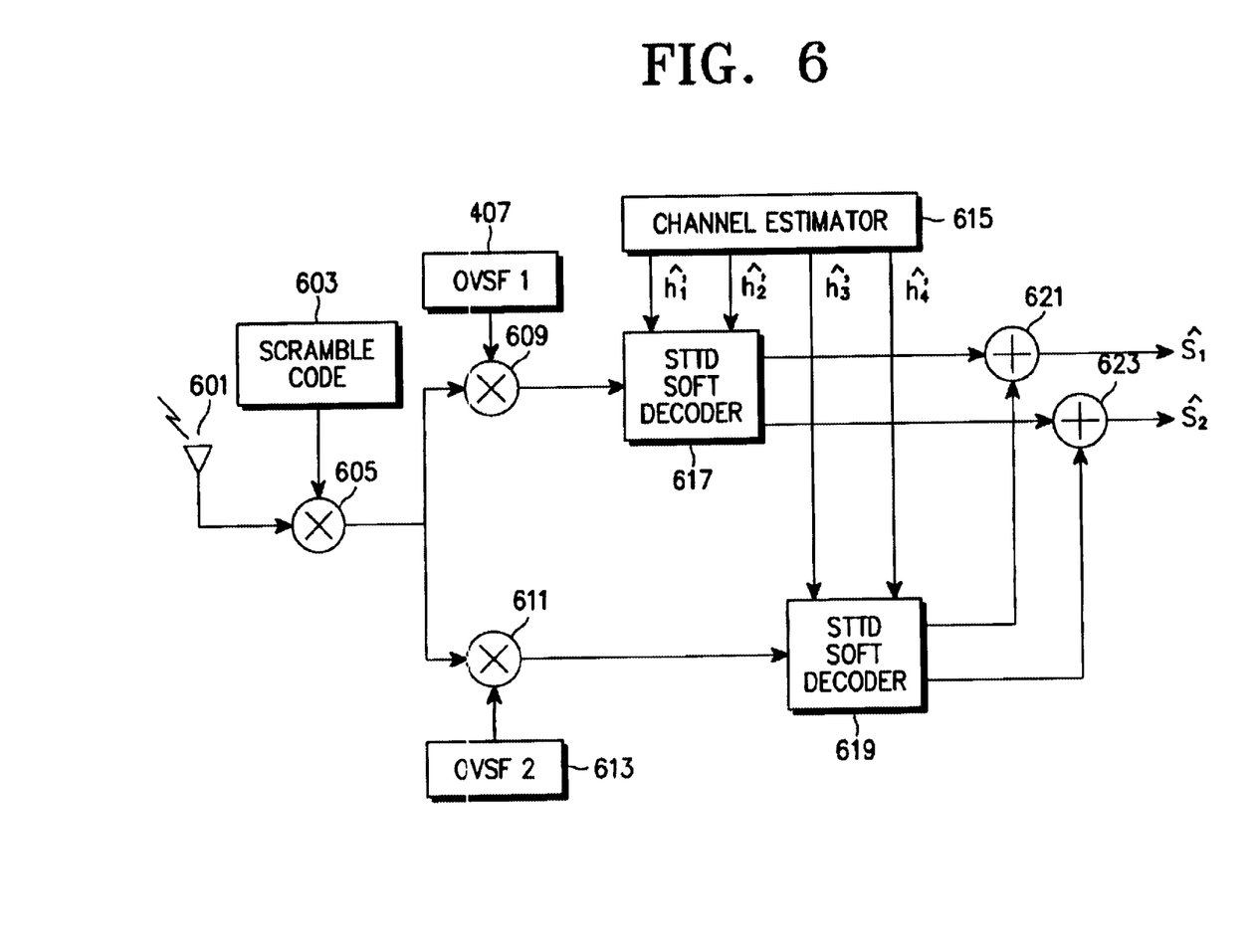
FIG. 6 is a block diagram of the transmission diversity receiver for estimating the common data according to the embodiment of the present invention.

FIG. 6 is a block diagram of the transmission diversity receiver, showing its common data estimating structure as the counterpart of the transmission diversity transmitter shown in FIG. 5 according to the embodiment of the present invention.

In FIG. 6, two outputs of the receiver, that is, the first and second data symbol estimated values are expressed in the following equations.

$$\hat{s}_1 = \hat{s}_{11} + \hat{s}_{21} \quad (13)$$

$$\hat{s}_2 = \hat{s}_{12} + \hat{s}_{22} \quad (14)$$

where $\hat{s}_{11}$ and $\hat{s}_{12}$ are the output of a first STTD soft decoder 617 and $\hat{s}_{21}$ and $\hat{s}_{22}$ are the output of a second STTD soft decoder 619.

A signal received at the MS 203 through an antenna 601 is converted to a baseband signal and applied to a despreader 605. The despreader 605 despreads the baseband signal with a scrambling code 603 and feeds the despread signal to orthogonal despreaders 609 and 611. The orthogonal despreader 609 despreads the input signal with a first orthogonal code OVSF 1 607 and the orthogonal despreader 611 despreads the input signal with the second orthogonal code OVSF2 613. The STTD soft decoder 617 performs soft decoding on the output of the multiplier 609 using the two leading symbols of the previous channel estimated value output from a channel estimator 615 and feeds the two results to adders 621 and 623, respectively. An STTD soft decoder 619 performs soft decoding on the output of the multiplier 611 using the two trailing symbols of the previous channel estimated value output from the channel estimator 615 and feeds the two results to adders 621 and 623, respectively. The adder 621 outputs its sum as a first data estimated value and the adder 623 outputs its sum as a second data estimated value. If the gain constant g 355 for the pilot channels is different from the gain constant g 555 for the common data channels, the output of the STTD soft decoder 617 is multiplied by a ratio of the gain constant g 555 to the gain constant g 355 before it is added to the output of the STTD soft decoder 619 in the adder 621. Similarly, the output of the STTD soft decoder 619 is multiplied by the ratio of the gain constant g 555 to the gain constant g 355 before it is added to the output of the STTD soft decoder 617 in the adder 623.

The operation of the transmission diversity system according to the embodiment of the present invention will be described in detail referring to FIGS. 2 to 6.

In general, a transmission antenna diversity system refers to a system where information is transmitted through a plurality of antennas so that despite loss of the information from a specific antenna, a signal is effectively recovered based on the information received from the other antennas. Therefore, an MS in this transmission antenna diversity system estimates multiple antenna channels and generates weights that satisfy maximal ratio combination. As stated before, a weight is fed back to a UTRAN so that the UTRAN assigns a weight in a closed loop mode, whereas the weight is used for combining antenna signals received at an MS in an open loop mode. The characteristics of the transmission antenna diversity system depend on the number of antennas used and it is possible to apply transmission diversity with two or more antennas.

When a 2-antenna transmission diversity MS enters the coverage area of a 4-antenna transmission diversity UTRAN using antennas #1 to #4, the UTRAN operates as if it is serviced through two antennas by grouping antennas #1 and #2 and antennas #3 and #4. On the other hand, if a 4-antenna transmission diversity MS enters the coverage area of the UTRAN, the UTRAN performs the 4-antenna transmission diversity by transmitting signals through the respective antennas.

A 2-antenna transmission diversity UTRAN in W-CDMA assigns two orthogonal pilot symbol patterns to two antennas and an MS estimates the two different antenna channels. The MS estimates a first antenna channel based on a first orthogonal symbol pattern and a second antenna channel based on a second orthogonal symbol pattern. Meanwhile, the 4-antenna diversity UTRAN transmits pilot signals by which the four antenna channels can be discriminated. To allow the 2-antenna diversity MS to operate without modification and to uniformly distribute signal power for performing the 2-antenna diversity through the four antennas, antennas #1 and #2 are grouped into an effective antenna A and antennas #3 and #4 are grouped into an effective antenna B. Among many methods of grouping two antennas in terms of signal processing, the same signal is transmitted through the two antennas here. The 2-antenna transmission diversity MS virtually receives signals from the effective antennas A and B.

If the channels of antennas #1 to #4 are $h_1$ to $h_4$, the channel of the effective antenna A $h_A = h_1 + h_2$ and the channel of the effective antenna B $h_B = h_3 + h_4$. In view of the nature of diversity channels, it is assumed that the channels $h_A$ and $h_B$ have the same characteristics as diversity channels for two antennas. For the 4-antenna diversity MS, diversity is performed via the four channels $h_1$ to $h_4$, whereas for the 2-antenna diversity MS, diversity is performed via the two channels $h_A$ and $h_B$.

The 4-antenna transmission diversity UTRAN can perform transmission diversity through the effective antennas A and B for the 2-antenna transmission diversity MS in many ways. One of them is to transmit an identical signal through antennas #1 and #2 (i.e., the effective antenna A) and another identical signal through antennas #3 and #4 (i.e., the effective antenna B).

In one of open loop transmission diversity schemes, STTD, original data is transmitted through the effective antenna A and diversity data through the effective antenna B to the 2-antenna transmission diversity MS. On the other hand, in one of closed loop transmission diversity schemes, T×AA (Transmit Antenna Array), the product of data and a first weight is transmitted through the effective antenna A and the product of data and a second weight through the effective antenna B.

The 4-antenna transmission diversity UTRAN transmits pilot symbol patterns on channels, each being a combination of two channels so that the 2-antenna transmission diversity MS may estimate the channels $h_A$ ($h_1+h_2$) and $h_B$ ($h_3+h_4$). Table 1 shown below illustrates a pilot transmission rule for a 2-antenna diversity MS in the 4-antenna transmission diversity system. As shown in Table 1, if the UTRAN transmits pilot symbol patterns, the MS acquires channels, each being the sum of two channels. The pilot symbol patterns are orthogonal pilot symbol patterns to discriminate antennas. The orthogonal symbol patterns are generated by Walsh codes and the like. In W-CDMA, a pilot signal is transmitted on a common pilot channel that has a unique channelization code. The MS estimates the channel $h_A$ ($h_1+h_2$) by auto-correlating a signal received on the common pilot channel to pattern #1 and the channel $h_B$ ($h_3+h_4$) by auto-correlating the received signal to pattern #2.

TABLE 1

| antenna number | antenna #1 | Antenna #2 | antenna #3 | antenna #4 |
|---|---|---|---|---|
| channel | $h_1$ | $h_2$ | $h_3$ | $h_4$ |
| pilot symbol pattern | pattern #1 | Pattern #1 | pattern #2 | pattern #2 |

The 4-antenna transmission diversity UTRAN compatible with the 2-antenna transmission diversity MS uses an additional common pilot channel to help channel estimation in a 4-antenna transmission diversity MS. An existing common pilot channel is called common pilot channel #1 and an additional common pilot channel, common pilot channel #2. The 4-antenna transmission diversity MS should estimate all the four antenna channels $h_1$ to $h_4$ by linearly combining the estimated values of common pilot channel #1 and common pilot channel #2 in the case where pilot signals are transmitted according to the transmission rule shown in Table 2 which incorporates the transmission rule of Table 1 therein.

Upon receipt of common pilot channel #1, the 4-antenna transmission MS estimates the channels $h_A$ ($h_1+h_2$) and $h_B$ ($h_3+h_4$) and upon receipt of common pilot channel #2, it estimates channels $h_C$ ($h_1-h_2$) and $h_D$ ($h_3-h_4$). Table 2 shows another pilot transmission rule for a 2-antenna diversity MS in the 4-antenna transmission diversity system.

TABLE 2

| antenna number | antenna #1 | | antenna #2 | | Antenna #3 | | antenna #4 | |
|---|---|---|---|---|---|---|---|---|
| channel | $h_1$ | | $h_2$ | | $h_3$ | | $h_4$ | |
| pilot symbol pattern | #1 | #1 | #1 | -#1 | #2 | #2 | #2 | -#2 |
| CPICH | #1 | #2 | #1 | #2 | #1 | #2 | #1 | #2 |

The 4-antenna transmission diversity UTRAN transmits signals through two antenna groups, that is, two effective antennas each including two antennas to support compatibility with the 2-antenna transmission diversity MS. For the 4-antenna transmission diversity MS, it performs diversity via the four antenna channels. To enable the 2-transmission diversity MS to operate as if it received signals from two transmission antennas, the UTRAN transmits pilot symbol patterns on common pilot channels #1 and #2 according to the transmission rule shown in Table 2. Therefore, the 4-antenna transmission diversity MS estimates the four antenna channels by linear combination of the pilots.

In W-CDMA, common data is transmitted on a common data channel that has a unique channelization code. The 2-antenna transmission diversity MS detects estimated data symbols by STTD-decoding the signal received on the common data channel using estimated values of the channel $h_A$ ($h_1+h_2$) and the channel $h_B$ ($h_3+h_4$). Table 3 shows a common data transmission rule for the 2-antenna transmission diversity MS in the 4-antenna transmission diversity system.

TABLE 3

| antenna number | antenna #1 | antenna #2 | antenna #3 | antenna #4 |
|---|---|---|---|---|
| channel | $h_1$ | $h_2$ | $h_3$ | $h_4$ |
| STTD code block | reference antenna block | reference antenna block | diversity antenna block | diversity antenna block |
| channel code | #3 | #3 | #3 | #3 |

The 4-antenna transmission diversity UTRAN compatible with the 2-antenna transmission diversity MS uses an additional common data channel for channel estimation in the 4-antenna transmission diversity MS. An existing common data channel and an additional common data channel are called here respectively, common data channel #1 and common data channel #2. The 4-antenna transmission diversity MS should estimate all the four antenna channels $h_1$ to $h_4$. If pilot signals are transmitted according to the rule shown in Table 4 that incorporates the transmission rule of Table 3 therein, transmitted symbols are estimated by linear combination of the estimated values of common data channels #1 and #2. Common data channel #1 is recovered to transmitted symbols based on the estimated values of $h_A$ ($h_1+h_2$) and $h_B$ ($h_3+h_4$) and common data channel #2 is recovered to transmitted symbols based on the estimated values of $h_C$ ($h_1-h_2$) and $h_D$ ($h_3-h_4$). Table 4 shows another common data transmission rule for 2-antenna transmission diversity in the 4-antenna transmission diversity system.

TABLE 4

| antenna number | Antenna #1 | | antenna #2 | | antenna #3 | | Antenna #4 | |
|---|---|---|---|---|---|---|---|---|
| Channel | $h_1$ | | $h_2$ | | $h_3$ | | $h_4$ | |
| common data symbol (STTD) | #1 | #1 | #1 | -#1 | #2 | #2 | #2 | -#2 |
| channel code | #1 | #2 | #1 | #2 | #1 | #2 | #1 | #2 |

In Table 4, common data symbol #1 is a reference antenna coding block and common data symbol #2 is a diversity antenna coding block.

The 4-antenna transmission diversity UTRAN transmits signals through two antenna groups, that is, two effective antennas each having two antennas in order to operate compatibly with the 2-antenna transmission diversity MS. For the 4-antenna transmission diversity MS, the UTRAN performs diversity via the four antenna channels. To enable the 2-antenna transmission diversity MS to operate as if there were two channels according to the conventional method, the UTRAN transmits common data on two common data channels according to the transmission rule defined in Table 4. The 4-antenna transmission diversity MS detects original signals from signals received on the common data channels in the 4-antenna transmission diversity scheme.

As described above, the present invention is advantageous in that when an MS supporting a different antenna transmission diversity scheme from that supported by a UTRAN is located within the service area of the UTRAN, compatibility is ensured between the different transmission diversity schemes and therefore, power balance is set between antennas.

On the assumption that one UTRAN services up to 100 users, the UTRAN consumes 100/4 power per antenna if only 4-antenna transmission diversity MSs exist within its service area, and up to 100/2 power at each used antenna if the UTRAN services 2-antenna transmission diversity MS through two antennas only. According to the present invention, although the 2-antenna transmission diversity MS exists within the service area, no more than 100/4 power maximum per antenna is consumed. Thus, there is no need for procuring RF devices such as complicated, expensive power amplifiers.

Also, in the case where the 2-antenna transmission diversity MS coexists with the 4-antenna transmission diversity MS within the 4-antenna transmission diversity system, pilot symbol patterns are transmitted so that the former estimates two antenna channels and the latter estimates four antenna channels. As a result, the 2-antenna transmission diversity MS does not need to be equipped with an additional device for estimation of four channels and the 4-antenna transmission diversity MS operates with a minimum number of devices.

A fourth advantage with the present invention is that 4-antenna diversity is implemented in effect for common data while being compatible with the 2-antenna transmission diversity MS.

Furthermore, since a first orthogonal code is set to all 0s and a second orthogonal code is set to 0s in its first half chips and 1s in its latter half chips as orthogonal codes for identifying antenna signals in a transmission diversity transmitter, limited orthogonal code resources are efficiently used.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A transmitter of a UTRAN (UMTS Terrestrial Radio Access Network) having at least four antennas in a mobile communication system, comprising:
   a first adder connected to a first antenna, for adding a first spread signal produced by spreading a first symbol pattern with a first orthogonal code and a second spread signal produced by spreading the first symbol pattern with a second orthogonal code orthogonal to the first orthogonal code;
   a second adder connected to a second antenna, for adding the first spread signal and a third spread signal produced by spreading a first inverted symbol pattern resulting from inverting the phase of the first symbol pattern with the second orthogonal code;
   a third adder connected to a third antenna, for adding a fourth spread signal produced by spreading a second symbol pattern orthogonal to the first symbol pattern with the first orthogonal code and a fifth spread signal produced by spreading the second symbol pattern with the second orthogonal code; and
   a fourth adder connected to a fourth antenna, for adding the fourth spread signal and a sixth spread signal produced by spreading a second inverted symbol pattern resulting from inverting the phase of the second symbol pattern with the second orthogonal code.

2. The transmitter of claim 1, wherein the symbol patterns are one of pilot symbol patterns and data symbol patterns.

3. A transmitter of a UTRAN (UMTS Terrestrial Radio Access Network) in a mobile communication system, comprising:
   a first adder connected to a first antenna, for adding a first spread signal produced by multiplying a first symbol pattern by a gain constant and spreading the product with a first orthogonal code and a second spread signal produced by spreading the first symbol pattern with a second orthogonal code orthogonal to the first orthogonal code;
   a second adder connected to a second antenna, for adding the first spread signal and a third spread signal produced by spreading a first inverted symbol pattern resulting from inverting the phase of the first symbol pattern with the second orthogonal code;
   a third adder connected to a third antenna, for adding a fourth spread signal produced by multiplying a second symbol pattern by the gain constant and spreading the product with the first orthogonal code and a fifth spread signal produced by spreading the second symbol pattern with the second orthogonal code; and
   a fourth adder connected to a fourth antenna, for adding the fourth spread signal and a sixth spread signal produced by spreading a second inverted symbol pattern resulting from inverting the phase of the second symbol pattern with the second orthogonal code.

4. The transmitter of claim 3, wherein the symbol patterns are one of pilot symbol patterns and data symbol patterns.

5. The transmitter of claim 3, wherein the gain constant is set to ensure the reception performance of a mobile station communicable with a transmitter of a UTRAN having less than four antennas.

6. The transmitter of claim 3, wherein the gain constant is set to ensure the reception performance of a mobile station communicable with a transmitter of a UTRAN having two antennas.

7. A signal transmitting method in a UTRAN (UMTS Terrestrial Radio Access Network) having at least four antennas in a mobile communication system, comprising the steps of:
   adding a first spread signal produced by spreading a first symbol pattern with a first orthogonal code and a second spread signal produced by spreading the first symbol pattern with a second orthogonal code orthogonal to the first orthogonal code and transmitting the sum through a first antenna;
   adding the first spread signal and a third spread signal produced by spreading a first inverted symbol pattern resulting from inverting the phase of the first symbol pattern with the second orthogonal code, and transmitting the sum through a second antenna;
   adding a fourth spread signal produced by spreading a second symbol pattern orthogonal to the first symbol pattern with the first orthogonal code and a fifth spread signal produced by spreading the second symbol pattern with the second orthogonal code, and transmitting the sum through a third antenna; and
   adding the fourth spread signal and a sixth spread signal produced by spreading a second inverted symbol pattern resulting from inverting the phase of the second symbol pattern with the second orthogonal code, and transmitting the sum through a fourth antenna.

8. The transmitter of claim 7, wherein the symbol patterns are one of pilot symbol patterns and data symbol patterns.

9. A signal transmitting method in a UTRAN (UMTS Terrestrial Radio Access Network) antennas in a mobile communication system, comprising the steps of:
   adding a first spread signal produced by multiplying a first symbol pattern by a gain constant and spreading the product with a first orthogonal code and a second spread signal produced by spreading the first symbol pattern with a second orthogonal code orthogonal to the first orthogonal code, and transmitting the sum through a first antenna;
   adding the first spread signal and a third spread signal produced by spreading a first inverted symbol pattern resulting from inverting the phase of the first symbol pattern with the second orthogonal code, and transmitting the sum through a second antenna;
   adding a fourth spread signal produced by multiplying a second symbol pattern by the gain constant and spreading the product with the first orthogonal code and a fifth spread signal produced by spreading the second symbol pattern with the second orthogonal code, and transmitting the sum through a third antenna; and
   adding the fourth spread signal and a sixth spread signal produced by spreading a second inverted symbol pattern resulting from inverting the phase of the second symbol pattern with the second orthogonal code, and transmitting the sum through a fourth antenna.

10. The method of claim 9, wherein the gain constant is set to ensure the reception performance of a mobile station communicable with a transmitter of a UTRAN having less than four antennas.

11. The method of claim 9, wherein the gain constant is set to ensure the reception performance of a mobile station communicable with a transmitter of a UTRAN having two antennas.

12. The method of claim 9, wherein the symbol patterns are one of pilot symbol patterns and data symbol patterns, the data symbol patterns being code blocks generated by application of STTD (Space Time block coding based Transmit Diversity).

13. A transmitter of a UTRAN (UMTS Terrestrial Radio Access Network) having at least four antennas in a mobile communication system, comprising:
- a first adder connected to a first antenna, for adding a first spread signal produced by spreading a first symbol pattern with a first orthogonal code and a second spread signal produced by spreading the first symbol pattern with a second orthogonal code orthogonal to the first orthogonal code, the first orthogonal code having chips of all 0s and the second spreading orthogonal code having 0s in the first half chips and 1s in the latter half chips;
- a second adder connected to a second antenna, for adding the first spread signal and a third spread signal produced by spreading a first inverted symbol pattern resulting from inverting the phase of the first symbol pattern with the second orthogonal code;
- a third adder connected to a third antenna, for adding a fourth spread signal produced by spreading a second symbol pattern orthogonal to the first symbol pattern with the first orthogonal code and a fifth spread signal produced by spreading the second symbol pattern with the second orthogonal code; and
- a fourth adder connected to a fourth antenna, for adding the fourth spread signal and a sixth spread signal produced by spreading a second inverted symbol pattern resulting from inverting the phase of the second symbol pattern with the second orthogonal code.

14. The transmitter of claim 13, wherein the symbol patterns are one of pilot symbol patterns and data symbol patterns.

15. A signal transmitting method in a UTRAN (UMTS Terrestrial Radio Access Network) having at least four antennas in a mobile communication system, comprising the steps of:
- adding a first spread signal produced by spreading a first symbol pattern with a first orthogonal code and a second spread signal produced by spreading the first symbol pattern with a second orthogonal code orthogonal to the first orthogonal code and transmitting the sum through a first antenna, the first orthogonal code having chips of all 0s and the second spreading orthogonal code having 0s in the first half chips and 1s in the latter half chips;
- adding the first spread signal and a third spread signal produced by spreading a first inverted symbol pattern resulting from inverting the phase of the first symbol pattern with the second orthogonal code, and transmitting the sum through a second antenna;
- adding a fourth spread signal produced by spreading a second symbol pattern orthogonal to the first symbol pattern with the first orthogonal code and a fifth spread signal produced by spreading the second symbol pattern with the second orthogonal code, and transmitting the sum through a third antenna; and
- adding the fourth spread signal and a sixth spread signal produced by spreading a second inverted symbol pattern resulting from inverting the phase of the second symbol pattern with the second orthogonal code, and transmitting the sum through a fourth antenna.

16. The transmitter of claim 15, wherein the symbol patterns are one of pilot symbol patterns and data symbol patterns.

17. A mobile station in a mobile communication system, which receives a first transmission signal to a fourth transmission signal on at least four antenna transmission channels, the first transmission signal being the sum of a first spread signal produced by spreading a first symbol pattern with a first orthogonal code and a second spread signal produced by spreading the first symbol pattern with a second orthogonal code orthogonal to the first orthogonal code, the second transmission signal being the sum of the first spread signal and a third spread signal produced by spreading a first inverted symbol pattern resulting from inverting the phase of the first symbol pattern with the second orthogonal code, the third transmission signal being the sum of a fourth spread signal produced by spreading a second symbol pattern orthogonal to the first symbol pattern with the first orthogonal code and a fifth spread signal produced by spreading the second symbol pattern with the second orthogonal code, and the fourth transmission signal being the sum of the fourth spread signal and a sixth spread signal produced by spreading a second inverted symbol pattern resulting from inverting the phase of the second symbol pattern with the second orthogonal code, the mobile station comprising:
- a plurality of despreaders for generating a first despread signal using the first orthogonal code and the first symbol pattern, a second despread signal using the first orthogonal code and the second symbol pattern, a third despread signal using the second orthogonal code and the first symbol pattern, and a fourth despread signal using the second orthogonal code and the second symbol pattern; and
- a plurality of adders for generating a first channel estimation signal by adding the first and third despread signals, a second channel estimation signal by adding the second and fourth despread signals, a third channel estimation signal by subtracting the third despread signal from the first despread signal, and a fourth channel estimation signal by subtracting the fourth despread signal from the second despread signal.

18. The mobile station of claim 17, wherein the symbol patterns are one of pilot symbol patterns and data symbol patterns.

19. A signal receiving method in a mobile station of a mobile communication system, comprising the steps of:
- receiving a first transmission signal to a fourth transmission signal on at least four antenna transmission channels, the first transmission signal being the sum of a first spread signal produced by spreading a first symbol pattern with a first orthogonal code and a second spread signal produced by spreading the first symbol pattern with a second orthogonal code orthogonal to the first orthogonal code, the second transmission signal being the sum of the first spread signal and a third spread signal produced by spreading a first inverted symbol pattern resulting from inverting the phase of the first symbol pattern with the second orthogonal code, the third transmission signal being the sum of a fourth spread signal produced by spreading a second symbol pattern orthogonal to the first symbol pattern with the first orthogonal code and a fifth spread signal produced by spreading the second symbol pattern with the second orthogonal code, and the fourth transmission signal being the sum of the fourth spread signal and a sixth spread signal produced by spreading a second inverted symbol pattern resulting from inverting the phase of the second symbol pattern with the second orthogonal code;
- generating a first despread signal by despreading the transmission signals with the first orthogonal code and the first symbol pattern, a second despread signal by despreading the transmission signals with the first orthogonal code and the second symbol pattern, a third despread signal by despreading the transmission signals with the second orthogonal code and the first symbol pattern, and a fourth despread signal by despreading the transmission signals with the second orthogonal code and the second symbol pattern; and estimating a first channel signal by adding the first and third despread signals, a second channel signal by adding the second and fourth despread signals, a third channel signal by subtracting the third despread signal from the first despread signal, and a fourth channel signal by subtracting the fourth despread signal from the second despread signal.

20. The method of claim 19, wherein the symbol patterns are pilot one of symbol patterns and data symbol patterns.

* * * * *